United States Patent
Hafiz et al.

(10) Patent No.: US 12,308,874 B2
(45) Date of Patent: May 20, 2025

(54) DYNAMICALLY PROVISIONING FOR A WIRELESS COMMUNICATION DEVICE, SYSTEM AND METHOD

(71) Applicant: Nextivity, Inc., San Diego, CA (US)

(72) Inventors: Sheikh A. Hafiz, San Diego, CA (US); Edward C. Lin, San Diego, CA (US); John Arnett Goocher, Davidson, NC (US)

(73) Assignee: Nextivity, Inc., San Diego, CA (US)

( * ) Notice: Subject to any disclaimer, the term of this patent is extended or adjusted under 35 U.S.C. 154(b) by 348 days.

(21) Appl. No.: 18/091,378

(22) Filed: Dec. 30, 2022

(65) Prior Publication Data

US 2023/0216531 A1 Jul. 6, 2023

Related U.S. Application Data

(60) Provisional application No. 63/295,725, filed on Dec. 31, 2021.

(51) Int. Cl.
*H04B 1/18* (2006.01)
*H04B 1/10* (2006.01)
*H04W 52/18* (2009.01)

(52) U.S. Cl.
CPC ............ *H04B 1/18* (2013.01); *H04B 1/109* (2013.01); *H04W 52/18* (2013.01)

(58) Field of Classification Search
CPC ........... H04B 1/18; H04B 1/10; H04W 52/18; H04W 84/042
See application file for complete search history.

(56) References Cited

U.S. PATENT DOCUMENTS

| | | | | |
|---|---|---|---|---|
| 8,417,720 B2* | 4/2013 | Sukanen | ............... | G06F 21/10 |
| | | | | 707/769 |
| 9,215,647 B2* | 12/2015 | Vannithamby | ....... | H04B 7/0639 |
| 9,439,134 B2* | 9/2016 | Zhu | .................. | H04W 72/0453 |
| 9,867,140 B2* | 1/2018 | Vannithamby | ....... | H04B 7/0456 |
| 10,111,023 B2* | 10/2018 | Zhu | ........................ | H04W 48/20 |
| 10,187,128 B2* | 1/2019 | Bilotta | ................. | H04W 16/26 |
| 10,218,403 B2* | 2/2019 | Koshy | ................. | H04W 52/281 |
| 10,420,023 B2* | 9/2019 | Ramasamy | ......... | H04W 52/288 |
| 10,425,133 B2* | 9/2019 | Bilotta | ................. | H04W 16/14 |
| 10,693,530 B2* | 6/2020 | Bilotta | ..................... | H04L 5/14 |
| 10,783,888 B2* | 9/2020 | Bargetzi | ................. | G10L 15/22 |
| 10,958,315 B2* | 3/2021 | Bilotta | ..................... | H04L 5/14 |

(Continued)

FOREIGN PATENT DOCUMENTS

EP 2708054 B1 * 3/2023 ......... H04J 11/0023

Primary Examiner — Hai V Nguyen
(74) Attorney, Agent, or Firm — FisherBroyles LLP; James P. Cleary (57) ABSTRACT

Aspects of the present disclosure generally pertains a system and method for wireless communications, for example, within a wireless wide area network (WAN), employing a wireless communication devices capable of operations in a plurality of enumerated categories of authorized use. Aspects of the present disclosure pertain to devices, systems and methods for dynamically provisioning a wireless communication device. Aspects of the present disclosure also pertain to systems and methods for devices, wireless operators, and/or private networks to implement different policies based on transmit power levels, device capabilities, locations, environmental and subscription services.

3 Claims, 5 Drawing Sheets

(56) References Cited

U.S. PATENT DOCUMENTS

| | | | |
|---|---|---|---|
| 10,966,273 B2* | 3/2021 | Mitsuhashi | H04W 52/38 |
| 11,102,719 B2* | 8/2021 | Ramasamy | H04W 52/367 |
| 11,233,546 B2* | 1/2022 | Bilotta | H04L 5/14 |
| 11,412,370 B2* | 8/2022 | Won | H04W 4/14 |
| 11,533,157 B2* | 12/2022 | Hassan Hussein | H04L 5/14 |
| 11,569,872 B2* | 1/2023 | Lin | H04B 1/40 |
| 11,943,013 B2* | 3/2024 | Lin | H04L 5/143 |
| 2010/0235381 A1* | 9/2010 | Sukanen | H04L 63/10 707/769 |
| 2010/0329247 A1* | 12/2010 | Kennedy | H04L 25/49 375/259 |
| 2013/0315094 A1* | 11/2013 | Vannithamby | H04L 5/0094 370/252 |
| 2014/0133381 A1* | 5/2014 | Zhu | H04B 7/0456 370/312 |
| 2016/0192298 A1* | 6/2016 | Vannithamby | H04B 7/0639 455/522 |
| 2016/0337785 A1* | 11/2016 | Zhu | H04W 52/0216 |
| 2018/0337711 A1* | 11/2018 | Bilotta | H04B 7/0413 |
| 2019/0036563 A1* | 1/2019 | Koshy | H04W 52/18 |
| 2019/0068353 A1* | 2/2019 | Kolze | H04L 5/14 |
| 2019/0074872 A1* | 3/2019 | Bilotta | H04W 16/26 |
| 2019/0172464 A1* | 6/2019 | Bargetzi | G10L 15/22 |
| 2019/0215765 A1* | 7/2019 | Ramasamy | H04W 52/243 |
| 2020/0015161 A1* | 1/2020 | Ramasamy | H01Q 1/2291 |
| 2020/0145175 A1* | 5/2020 | Hassan Hussein | H04W 72/541 |
| 2020/0280349 A1* | 9/2020 | Bilotta | H04W 16/26 |
| 2021/0234576 A1* | 7/2021 | Bilotta | H04L 5/14 |
| 2022/0123791 A1* | 4/2022 | Lin | H04L 5/14 |
| 2022/0210079 A1* | 6/2022 | Koren | G06F 18/24 |
| 2023/0069177 A1* | 3/2023 | Albright | G06F 11/3089 |
| 2023/0099849 A1* | 3/2023 | Bai | H04W 52/325 370/329 |
| 2023/0179267 A1* | 6/2023 | Lin | H04L 5/14 375/222 |
| 2024/0072850 A1* | 2/2024 | Lin | H04W 16/26 |

* cited by examiner

DYNAMICALLY PROVISIONING FOR A WIRELESS COMMUNICATION DEVICE, SYSTEM AND METHOD

CROSS-REFERENCE TO RELATED APPLICATIONS

This application claims priority to U.S. provisional patent application 63/295,725 filed Dec. 31, 2021 entitled "DYNAMICALLY PROVISIONING A WIRELESS COMMUNICATION DEVICE, SYSTEM AND METHOD"; the contents of which are incorporated herein by reference in its entirety.

BACKGROUND OF THE INVENTION

Technical Field

The present disclosure generally pertains to wireless communication devices, and is more particularly directed towards a single device capable of operating in a plurality of classes.

Related Art

Normally a wireless communication device is designed, certified, and provisioned for a single mode of operation, such as a power class based on maximum output power. A typical (simplified) process for connecting to a wireless network might include: Initiating the device at its normal mode of operation (e.g., power class); Initiating a network connection at the normal mode of operation; and If the network connection is approved, operating in normal mode of operation; or If the network connection is rejected, suspending network operation.

Currently, wireless communication devices are being made with multiple modes of operation, or at least capacity therefore. To illustrate, it may be more efficient to manufacture a single device or processor that has the functionality to operate in a plurality of modes, yet limit the device's operation to one particular mode. For example, the allowed power class of a wireless communication device is typically be Class 1, Class 2, Class 3, . . . Class N, as defined by regulatory bodies and 3GPP specifications. Thus, a single device might be capable of operating in a plurality of power classes. Notwithstanding, the device may be authorized, provisioned for, or otherwise limited to operation in a single power class, based on its intended/originally provisioned/authorized use.

U.S. Pat. No. 10,187,128 to Bilotta, et al. on Jan. 22, 2019, shows an extended range wireless inter-networking system and device. Aspects of that disclosure include a wireless communication device having a wireless wide area network (WWAN) radio that has both a full duplex standard power port configured to communicate over a WWAN (i.e., within one power class) and a full duplex high power port configured to communicate over a WWAN (i.e., within a second, higher power class).

The present disclosure is directed toward overcoming known problems and problems discovered by the inventors.

SUMMARY

Aspects of the present disclosure generally pertains a system and method for wireless communications, for example, within a wireless wide area network (WWAN), employing a wireless communication devices capable of operations in a plurality of enumerated categories of authorized use. Aspects of the present disclosure pertain to systems and methods for dynamically provisioning a wireless communication device. Aspects of the present disclosure also pertain to systems and methods for devices, wireless operators, and/or private networks to implement different policies based on transmit power levels, device capabilities, locations, environmental and subscription services.

According to one embodiment, a wireless communication device is disclosed herein. The wireless communication device includes a processor, a wireless wide area network (WWAN) radio, a device identifier module, and a dynamic power controller communicably coupled to the device identifier module and to the processor. The WWAN radio is communicably coupled to and operable by the processor. The WWAN radio includes a WWAN transceiver/MODEM configured to communicate over at least one WWAN, a standard power port communicably coupled to the WWAN transceiver/MODEM, and a high power port. The standard power port is configured as a standard duplex chain including a standard power port antenna, the standard power port configured to transmit at a first maximum power level. The high power port is configured as a high power duplex chain including a high power antenna, the high power configured to transmit at a second maximum power level, said second maximum power level being greater than said first maximum power level. The device identifier module is configured to uniquely identify the wireless communication device, said device identifier module including a modifiable field; The dynamic power is configured read the modifiable field of the device identifier module, and to select between the standard power port and the high power port for communications of the wireless communication device over the at least one WWAN.

According to another embodiment, a system for wireless communications is also disclosed herein. The system for wireless communications includes a wireless wide area network (WWAN) and a wireless communication device. The wireless communication device is as described above, including the processor, the WWAN radio, the device identifier module, and the dynamic power controller communicably coupled to the device identifier module and to the processor, as above. The WWAN and the wireless communication device are communicably coupleable via the standard power port and the high power port for communications of the wireless communication device over the WWAN.

According to yet another embodiment, a method for provisioning user equipment between a first power class and a second power class is also disclosed herein. The method includes the steps of providing a wireless communication device as described above, including the processor, the WWAN radio, the device identifier module, and the dynamic power controller communicably coupled to the device identifier module and to the processor, as above; reading a power class setting in the modifiable field of the device identifier module via the dynamic power controller; selecting between the standard power port and the high power port via the dynamic power controller and response to said reading the power class setting in the modifiable field; and initiating a network connection with the at least one WWAN at the selected power class setting.

DETAILED DESCRIPTION

Aspects of the present disclosure generally pertains a system and method for wireless communications, for example, within a wireless wide area network (WWAN), employing a wireless communication devices capable of operating in a plurality of enumerated categories of authorized use. Aspects of the present disclosure also pertain to systems and methods for dynamically provisioning a wireless communication device. Aspects of the present disclosure further pertain to systems and methods for devices, wireless operators, and/or private networks to implement different policies based on transmit power levels, device capabilities, locations, environmental and subscription services.

This disclosure allows activating or changing polices for a device, for example, by adjusting its output power levels to the corresponding power classes for a single or certain group of devices that could be used for subscription, feature activation, and/or billing purposes. To illustrate, the allowed power class ("PC") of the device could be enumerated as PC1, PC2, PC3, . . . PCN, for example, as defined by the regulatory bodies and 3GPP specifications.

Various aspects of the novel systems, devices, and methods are described more fully hereinafter with reference to the accompanying drawings. The detailed description set forth herein, in connection with the appended drawings, is intended as a description of various configurations and embodiments, and is not intended to represent the only configurations in which the concepts described herein may be practiced. The detailed description includes specific details for the purpose of providing a thorough understanding of various concepts. In particular, it will be apparent to those skilled in the art that these concepts may be practiced without these specific details. In some instances, well known structures and components are shown in block diagram form in order to avoid obscuring such concepts.

Figure 1:
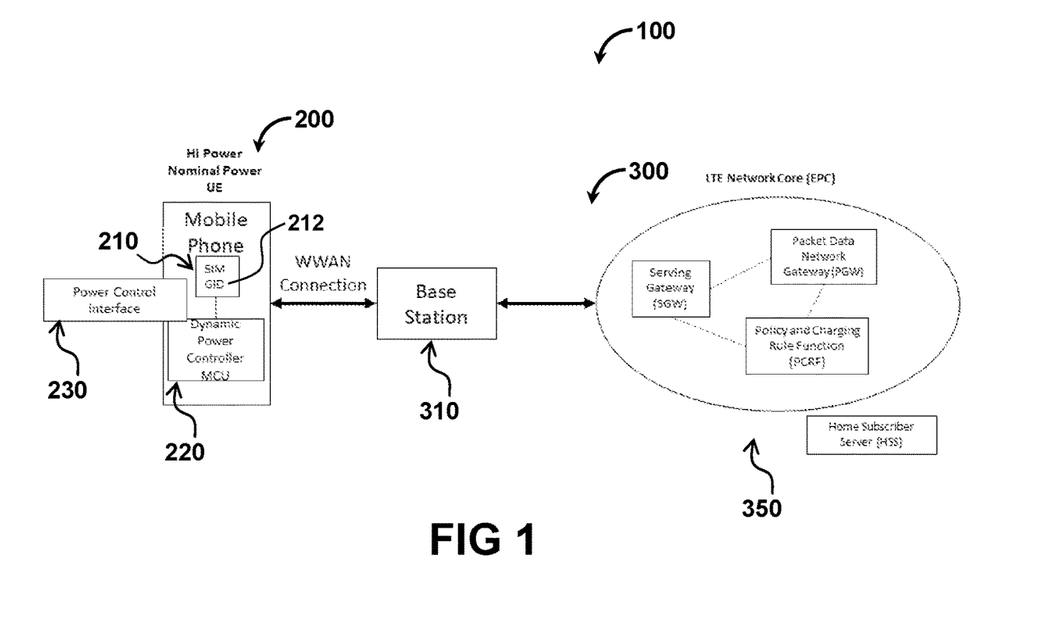
FIG. 1 schematically illustrates a system for dynamically provisioning a wireless communication device, according to one embodiment of the disclosure.

FIG. 1 schematically illustrates a system for dynamically provisioning a wireless communication device, according to one embodiment of the disclosure. In particular, a system and method for dynamically switching power classes for high power service provisioning and network feature activation using Group Identifier (GID) of User Equipment (UE) service provisioning is shown. Here, a system 100 may generally include at least one wireless communication device 200 and at least one wireless wide area network (WWAN) 300, such as a cell phone network.

According to one embodiment, the system 100 may be configured to provide for an operator to manage and change a power class and associated maximum output transmit power level of the wireless communication device 200 based on high power user equipment (HPUE) subscription or provisioning services and network operation. This can be implemented by novel method as described below, where the wireless communication device 200 may dynamically change its operation mode or capabilities by invoking a set of software, firmware or hardware controlling instructions.

The wireless communication device 200 may be any type of wireless communication device (e.g., cell phone, tablet; computer, etc.) configured to communicate over the WWAN (s), but which is configured to operate in at least two modes. The wireless communication device 200 may be provisioned to operate in a primary mode, but also operable at least one alternate mode. For example, wireless communication device 200 may be primarily provisioned to operate at a standard power (e.g., PC3), but also at a high power (e.g., PC1), and vis versa.

According to one embodiment, the wireless communication device 200 may be embodied as smartphone configured as a high power/nominal power user equipment (UE). The wireless communication device 200 may include a unique device identifier module 210 such as a subscriber identification module (SIM card), where the unique device identifier module 210 further includes at least one mode field 212 that is not unique/personal to the device. The mode field 212 may be a dedicated field of the device identifier module 210 or a repurposed field (e.g., a repurposed field within the SIM). This field may be a shared field such as a group identifier (GID) that identifies a group that user equipment pertains to. Preferably, the mode field 212 may be remotely modifiable or otherwise reprogrammable.

The wireless communication device 200 may further include a dynamic power control module 220 such as a microcontroller unit (MCU configured to control or otherwise modify the user equipment's operation mode). According to one embodiment, the wireless communication device 200 may further include a power control interface 230, such as a touchpad activated application (e.g., user equipment call manager) configured to allow a user to modify or request modification of the operation mode of the wireless communication device 200. As above, the wireless communication device 200 may dynamically change its capabilities (e.g., power class) by invoking a set of software, firmware or hardware controlling instructions using group identifier or GID value updates or changes.

The WWAN 300 may include conventional aspects such as a plurality of base stations 310 and a network core 350, such as an LTE network core or Evolved Packet Core (EPC). Accordingly, the network core may include conventional network components or "nodes" such as home subscriber server (HSS), serving gateway (SGW), packet data network gateway (PGW), Policy and Charging Enforcement Function (PCEF), and Mobility Management Entity (MME), as developed and released by 3rd Generation Partnership Project (3GPP), for reference.

Figure 2:
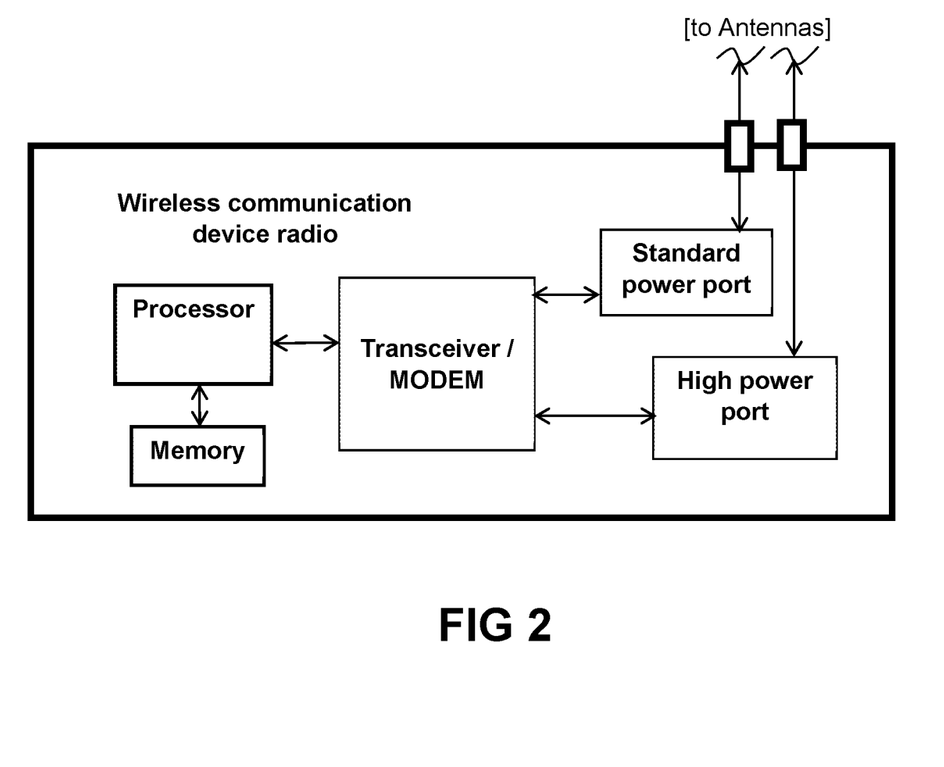
FIG. 2 schematically illustrates a wireless communication device radio, according to one embodiment of the disclosure.

FIG. 2 schematically illustrates a wireless communication device radio, according to one embodiment of the disclosure. In particular, a system and method for dynamically changing UE capabilities for adapting and multiplexing different power classes and transmit power levels of User Equipment (UE) service provisioning is shown.

Aspects of the present disclosure relate to wireless communication devices capable of operating in a plurality of enumerated categories of authorized use over a wireless wide area network (WWAN) employing one or more extended range wireless devices such as smartphones, and other data devices in general. Embodiments of the system and method may be directed toward a wireless communicating device including a high powered WWAN radio with high efficiency circuitry (e.g., utilizing 25% and above efficient amplifiers) to make it possible to implement in a personal, portable, and/or in-vehicle form factor, which may provide reasonable battery life, size, weight, and thermal dissipation, such as described in U.S. Pat. No. 10,187,128 Bilotta, et al. For example, the disclosure may include or otherwise utilize wireless communication device having both a standard port for full duplex communications and a high power port for full duplex communications, and where a WWAN modem is integrated with an efficient radio frequency (RF) front-end (RFFE) having the appropriate capability to meet stringent wireless requirements in a fashion that increases network performance without degradation to the performance of either the wireless network system, neighboring wireless equipment, and its own receive performance (include drawing of antenna and filtering of RFFE to avoid desense and enable high power). The higher performance modem may be integrated seamlessly at the RF section and the appropriate protocol level to ensure network control performance is seamless and avoids improper interactions within the system at all protocol layers. It may also include other WWAN operational bands (e.g., multi-band) that may or may not be of higher power and integrate seamlessly, whether under local control or through a handoff process under network control. Included within this disclosure are antenna configurations beneficial for performance without creating self-interference.

As shown in this simplified schematic, the wireless communication device radio may generally include standard components such as one or more processors, memories, a transceiver/MODEMs and an RFFE. In particular, the RFFE may be configured to operate according to a plurality of operating modes. For example, the RFFE may include a standard power port and high power port, where standard power port corresponds to a Class 3 device and the high power port corresponds to a Class 1 device. According to one embodiment, the transceiver/MODEM may be configured to select between either of the standard power port (e.g., for operation as Class 3 device) and the high power port (e.g., for operation as Class 1 device). Alternately, the wireless communication device radio may include a plurality of transceivers or transceiver/MODEMs selectable by the one or more processors.

Figure 3:
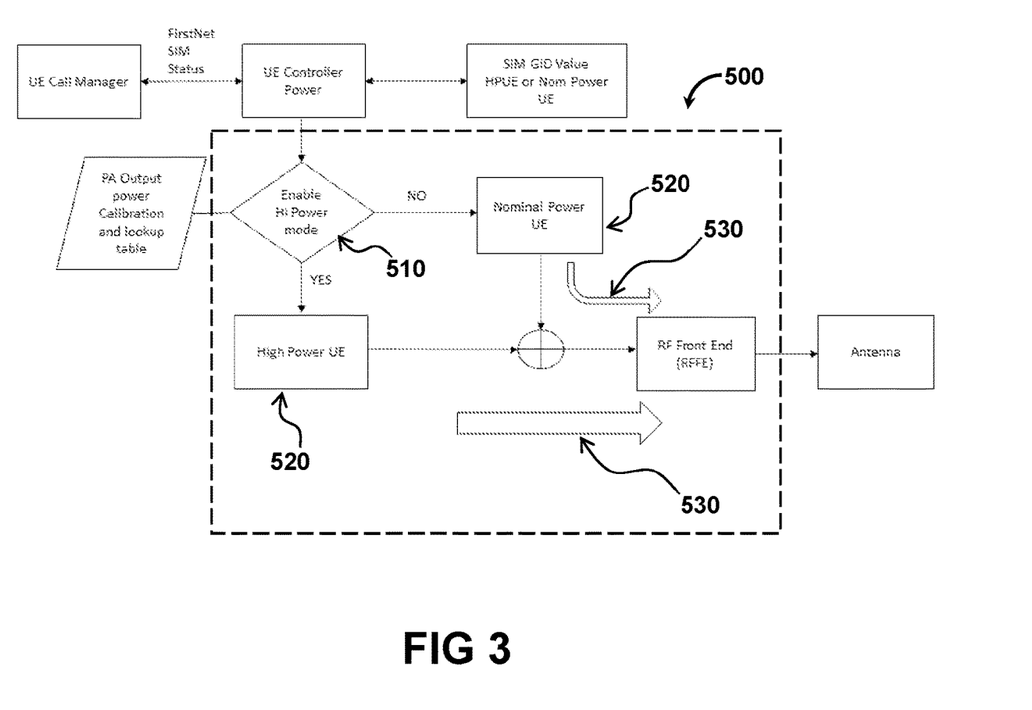
FIG. 3 schematically illustrates a method for dynamically provisioning a wireless communication device, showing user equipment processes, according to one embodiment of the disclosure.

FIG. 3 schematically illustrates a method for dynamically provisioning a wireless communication device, showing user equipment processes, according to one embodiment of the disclosure. Generally, systems and methods for activating or deactivating high power or low power capabilities based on corresponding power classes of the wireless communication device 200 (FIG. 1) may be achieved by reading the group identifier also known as GID in the SIM, network defined policies, or device management policy, or by the subscriber. The command for changing the above capabilities can be subscription based which is invoked from the serving network, or from the SIM provisioning or the device using its own policy as set by the organization or end user. The network and changing power class and power levels from Class 1 through class N are defined by regulatory bodies or 3GPP specifications, and provisioned by network operators.

As above, the wireless communication device 200 may dynamically change its capabilities (here, power class) via its dynamic power control module 220 (FIG. 1). In particular and also as above, the device identifier module 210 (FIG. 1) may include the mode field 212 (FIG. 1) that is not unique/personal to the device such as the group identifier (GID), which may be communicably coupled to or otherwise accessible by the dynamic power control module 220. Further, the wireless communication device 200 may include the power control interface 230 (FIG. 1).

According to one embodiment, a method 500 for dynamically provisioning the wireless communication device 200 may be directed toward dynamically changing its power class on the network as well as the maximum transmission power of the user equipment. For example, the method 500 may result in the UE's capabilities being changed in response to the GID in subscriber identity module (SIM) being changed or updated. According to one embodiment, the GID value for provisioning or activating the high power user equipment (HPUE) feature to enable high power transmissions, such as Power Class 1 (+31 dBm) transmit output power, can be pre-defined within a range stored within the SIM, or can be sent from the network for a unique range of for specific IMEI of HPUE device (discussed below).

Generally, the method of activation may include reading the value or invoking a command in the SIM or UE to execute a set of programming instructions for changing the UE capability information that is used for device registration. In particular, the method 500 may first include inquiring 510 the operation mode setting of the UE. For example, the power control interface 230 may activate the dynamic power control module 220 (e.g., responsive to a network inquiry) where the mode field 212 is requested. To illustrate, the mode field 212 may be set as a HPUE operation mode (high power) or a UE operation mode (standard/nominal power).

Next, the method 500 may include configuring 520 the UE according to the operation mode setting. In particular, the UE may look up operation parameters (e.g., power amplifier output power and calibration data) from a memory and configure the UE for high power operations or standard/nominal power operations, respectively. Further, where the radio frequency front end (RFFE) includes selectable ports (e.g., high power and standard power, respectively), the appropriate RFFE port may be selected. Next, the method may include communicating 530 in the selected operation mode (e.g., high power or standard power).

Figure 4:
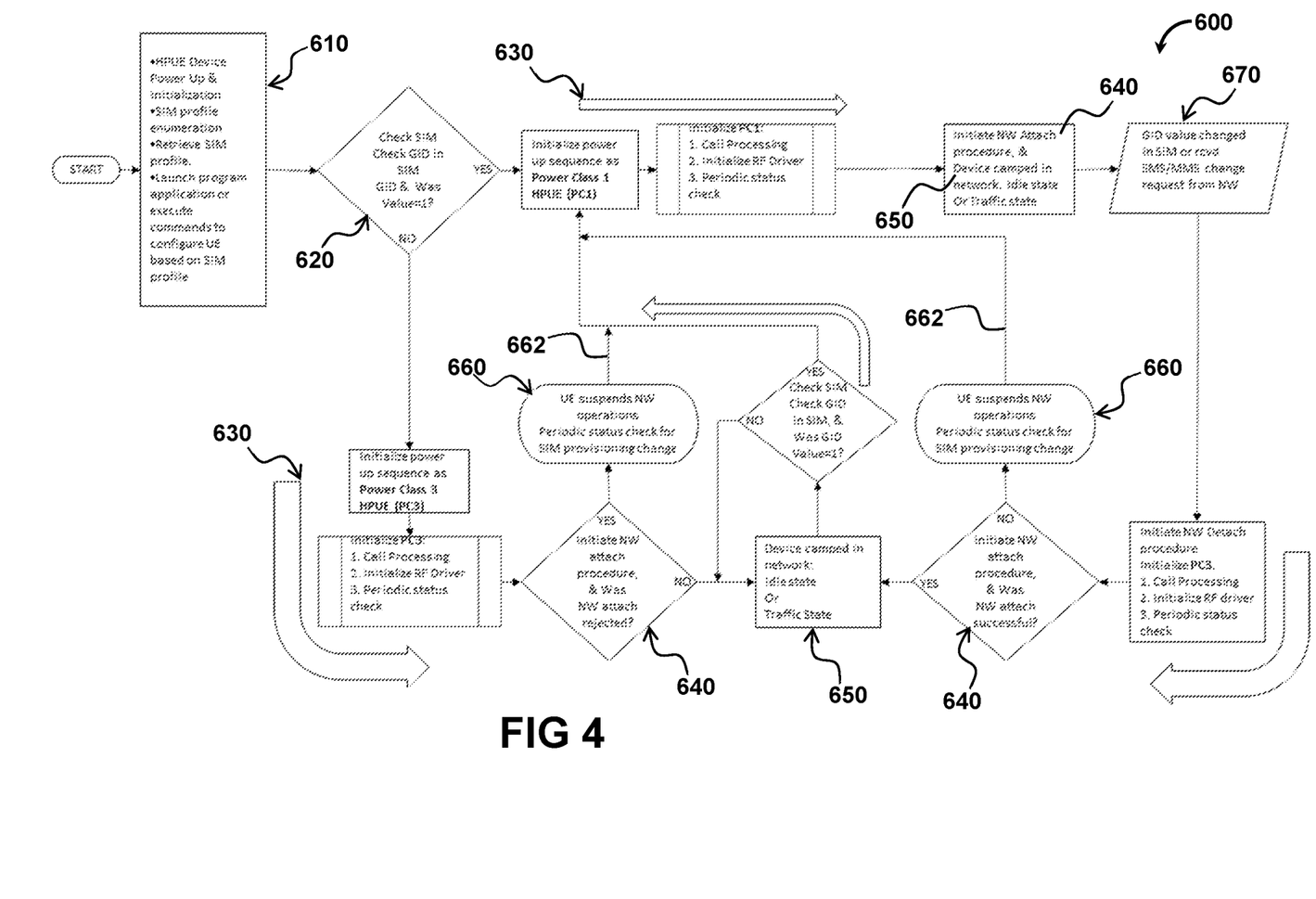
FIG. 4 schematically illustrates a method for dynamically provisioning a wireless communication device, showing system level processes, according to one embodiment of the disclosure.

FIG. 4 schematically illustrates a method for dynamically provisioning a wireless communication device, showing system level processes, according to one embodiment of the disclosure. As above, the system/wireless communication device 200 may dynamically change its capabilities (e.g., power class) by invoking a set of software, firmware or hardware controlling instructions using the mode field 212 of the device identifier module 210 (e.g., using a stored value in a group identifier or GID, value updates, or changes). Further, the command for changing the above capabilities can be subscription based which is invoked from the serving network, or from the SIM provisioning or the device using its own policy as set by the organization or end user.

Also as above, the method proposed may be where the capabilities are changed when the GID in subscriber identity module (SIM) is changed or updated. For example, the GID value for provisioning or activating the HPUE feature to enable Power Class 1 (+31 dBm) transmit output power can be pre-defined within a range stored within the SIM, or can be sent from the network for a unique range of for specific IMEI of HPUE device. The method of activation may further include reading the value or invoking a command in the SIM or UE to execute a set of programming instructions for changing the UE capability information that is used for device registration.

As shown, the method 600 here may provide for dynamic power class change for network service provisioning for single packet data protocol (PDP) context activation. Further, method 600 may include one or more steps of method 500 above. Here, method 600 may generally include initiating 610 the device and reading 620 a selectable power class setting, configuring 630 at least one radio according to a selected power class setting, and initiating 640 a network connection at the selected power class setting. Further, if the initiated network connection is approved, the method 600 may include operating 650 in selected power class setting. However, if the network connection is rejected, the method 600 may include suspending 660 network operation.

According to one embodiment, if network connection rejected and the selected power class setting is a primary power class setting, the method 600 may include suspending 660 network operation. However, if network connection rejected and selected power class setting is not primary power class setting, the method 600 may include configuring 662 the radio according to alternate power class setting. The method 600 may then further include initiating network connection at that selected power class setting.

In addition to the above, this disclosure may also include the UE's ability to maintain multiple power classes for different types of services and modes (e.g., IoT and Mission Critical or Broadband) by keeping simultaneous data connectivity with 4G and 5G base stations.

According to one embodiment, the method 600 may provide for parallel communication over diverse modes. One such example will be a Router, Gateway or UE simultaneously using Power Class 1 for mission critical services and Power Class 3 for Broadband services. This can be implemented in dynamic power class in software defined radio (SDR), 5G Network Slicing, Numerology where the same radio will establish multiple data sessions using different profiles with different power classes. According to one embodiment, this can be achieved by activating two or more data sessions (PDCP) with the same base station or different base stations for both 4G RAN or one 4G one 5G RAN or both 5G RAN providing services to different group of people or differently provisioned service types. In this example, the same UE can add a 3rd data session for low power IoT services using by dynamically changing to Power Class 4.

Alternately, or in addition, the power class usage and services could be enabled using existing Quality of Service Class Indicator QCI values or assigning different range or values of QC's for different power classes; this can also be implemented by a unique bit identifier for each QCI or introducing new ranges in the 4G and 5G standards. Beneficially, dynamic power UEs may be tested and certified across all power classes or to the maximum power level as required by the regulatory authorities.

According to one embodiment, the power class reporting and capability message will be dynamically changed or during initialization as per their configured power class which will be used during registration process, re-registration and operation in the networks. For example, the device may also adjust this when the network sends the command without needs for re-registration with the network. Also for example, one group of devices may be within a mesh network MANET that can be initiated with one device that can pass the subscription properties to other devices within the group like parent child or mesh.

According to one embodiment, the method 600 may include switching the operation mode from a first selected mode to a second mode 670. In particular, the method 600 may provide for operating in different modes based on diverse triggers that require, indicate, or merely suggest a desired or optimal operation mode. For example, and as above, the GID value may be locally commanded to change, such as via a change request by the user by the power control interface 230 (FIG. 1). Also for example, the wireless communication device 200 may be remotely commanded to change, such as via a change request message (e.g., SMS/MMS) from the network 300 (FIG. 1). Also for example, the wireless communication device 200 may also self-administer the policy change, for example, based on placement in a docking station or while in use in body worn instruments to meet SAR requirements, reduce power consumption, thermal mitigation or priority services for mission critical applications like First Responders, enterprise, industrial, medical, other government entities or general consumers.

Figure 5:
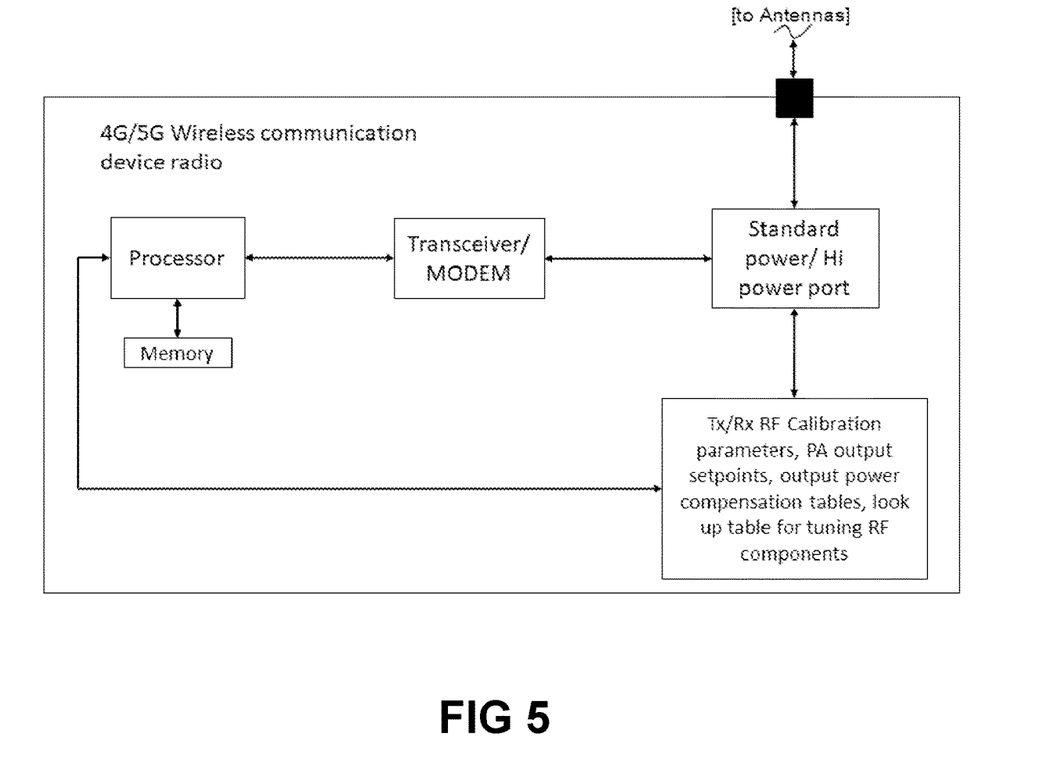
FIG. 5 schematically illustrates a wireless communication device radio, according to one embodiment of the disclosure.

FIG. 5 schematically illustrates a wireless communication device radio, according to one embodiment of the disclosure. In particular, the system and method for dynamically changing UE capabilities within a single transceiver port is shown. As above, the system may generally include at least one wireless communication device and at least one wireless wide area network (WWAN), such as a cell phone network. Also as above, dynamically changing UE capabilities may include dynamically adapting and multiplexing different power classes and transmit power levels of UE service provisioning.

According to one embodiment, the system and method for dynamically changing UE capabilities may relate to 4G and 5G wireless communication devices. In particular, the UE or wireless communications device may be embodied as one or more extended range wireless devices such as smartphones, and other data devices in general. For example, here the wireless communication device radio is embodied as a 4G and 5G radio, capable of operating in a plurality of enumerated categories of authorized use over a wireless wide area network (WWAN) (e.g., 4G/5G, standard power 4G/high power 5G, high power 4G/standard power 5G, etc.)

As above, the modifiable capabilities of the UE may include its power class network provisioning. According to one embodiment, and as shown, the power amplifier and/or RF components within the integrated RF front end (RFFE) may be dynamically modifiable (e.g., after initial network provisioning, and without change of user). In particular, the power amplifier and/or RF components may have a calibration routine (combined or separate) for tuning the components for nominal/standard power or high power output. For example, the calibration routine may be selected or otherwise determined as per the GID provisioning/code.

To illustrate, this calibration routine may contain a table that could be dynamically loaded for 4G or 5G WWAN device provisioning or pre-loaded at the time of power up, or may be implemented by means of switching components between nominal power and high power mode. For example, the UE/wireless communication device may include a WWAN modem is integrated with a combined standard port and high power port for full duplex communications.

As above, the combined standard port/high power port may then include an efficient radio frequency (RF) front-end (RFFE) having the appropriate capability to meet stringent wireless requirements in a fashion that increases network performance without degradation to the performance of either the wireless network system, neighboring wireless equipment, and its own receive performance (include drawing of antenna and filtering of RFFE to avoid desense and enable high power). Further, the UE/wireless communication device may include, be coupleable to (e.g., via coupling ports), or otherwise incorporate one or more antennas or antenna configurations tuned to each performance mode, without creating self-interference.

Finally, the processor or other controller may tune or otherwise reconfigure the RFFE for operation as provisioned by the network. For example, this may include increasing/decreasing transmit power by power amplifier selection or otherwise modifying carrier signal amplification. According to one embodiment, the selected operation mode may be represented by an entry in the unique device identifier module (e.g., GID in SIM), which may be generated onboard and/or pushed or pulled from the network, or any combination thereof. Further, the entry may be user initiated or network initiated.

The disclosure has been sufficiently described so that a person of ordinary skill in the art can reproduce and obtain the results mentioned in the present disclosure. However, any skilled person in the field of the art of the present disclosure may be able to make modifications not described in the present application. Notwithstanding, if these modifications require a structure or manufacturing process not described in the present disclosure, the modifications should be understood to be within the scope of the claims.

What is claimed is:

1. A wireless communication device comprising:
a processor;
a wireless wide area network (WWAN) radio communicably coupled to and operable by the processor, the WWAN radio including
a WWAN transceiver/MODEM configured to communicate over at least one WWAN,
a standard power port communicably coupled to the WWAN transceiver/MODEM, and configured as a standard duplex chain including a standard power port antenna, the standard power port configured to transmit at a first maximum power level, and
a high power port configured as a high power duplex chain including a high power antenna, the high power configured to transmit at a second maximum power level, said second maximum power level being greater than said first maximum power level;
a device identifier module configured to uniquely identify the wireless communication device, said device identifier module including a modifiable field; and
a dynamic power controller communicably coupled to the device identifier module and to the processor, said dynamic power controller configured read the modifiable field of the device identifier module, and to select between the standard power port and the high power port for communications of the wireless communication device over the at least one WWAN.

2. A system for wireless communications comprising:
a wireless wide area network (WWAN); and
a wireless communication device including
a processor,
a WWAN radio communicably coupled to and operable by the processor, the WWAN radio including
a WWAN transceiver/MODEM configured to communicate the WWAN,
a standard power port communicably coupled to the WWAN transceiver/MODEM, and configured as a standard duplex chain including a standard power port antenna, the standard power port configured to transmit at a first maximum power level, and
a high power port configured as a high power duplex chain including a high power antenna, the high power configured to transmit at a second maximum power level, said second maximum power level being greater than said first maximum power level,
a device identifier module configured to uniquely identify the wireless communication device, said device identifier module including a modifiable field, and
a dynamic power controller communicably coupled to the device identifier module and to the processor, said dynamic power controller configured read the modifiable field of the device identifier module, and to select between the standard power port and the high power port for communications of the wireless communication device over the WWAN.

3. A method for provisioning user equipment between a first power class and a second power class, the method comprising:
providing a wireless communication device including
a processor,
a wireless wide area network (WWAN) radio communicably coupled to and operable by the processor, the WWAN radio including
a WWAN transceiver/MODEM configured to communicate over at least one WWAN,
a standard power port communicably coupled to the WWAN transceiver/MODEM, and configured as a standard duplex chain including a standard power port antenna, the standard power port configured to transmit at a first maximum power level and
a high power port configured as a high power duplex chain including a high power antenna, the high power configured to transmit at a second maximum power level, said second maximum power level being greater than said first maximum power level,
a device identifier module configured to uniquely identify the wireless communication device, said device identifier module including a modifiable field, and
a dynamic power controller communicably coupled to the device identifier module and to the processor, said dynamic power controller configured read the modifiable field of the device identifier module, and to select between the standard power port and the high power port for communications of the wireless communication device over the at least one WWAN;
reading a power class setting in the modifiable field of the device identifier module via the dynamic power controller;
selecting between the standard power port and the high power port via the dynamic power controller and response to said reading the power class setting in the modifiable field; and
initiating a network connection with the at least one WWAN at the selected power class setting.

* * * * *